(12) United States Patent
Yonetani (10) Patent No.: US 12,298,184 B2
(45) Date of Patent: May 13, 2025

(54) IDENTIFICATION APPARATUS

(71) Applicant: CANON KABUSHIKI KAISHA, Tokyo (JP)

(72) Inventor: Yuki Yonetani, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 144 days.

(21) Appl. No.: 17/931,756

(22) Filed: Sep. 13, 2022

(65) Prior Publication Data

US 2023/0003580 A1  Jan. 5, 2023

Related U.S. Application Data

(63) Continuation of application No. PCT/JP2021/011567, filed on Mar. 22, 2021.

(30) Foreign Application Priority Data

Mar. 27, 2020 (JP) ................................. 2020-057795

(51) Int. Cl.
*G01J 3/44* (2006.01)
*G01N 21/65* (2006.01)

(52) U.S. Cl.
CPC ................ *G01J 3/44* (2013.01); *G01N 21/65* (2013.01)

(58) Field of Classification Search
CPC ....... G01N 2015/1006; G01N 15/0255; G01N 2015/0288; G01N 15/10; G01N 2015/1028; G01N 15/149; G01N 15/1404; G01N 15/1459; G01N 15/1425; G01N 15/1427; G01N 15/1433; G01N 15/1492; G01N 2015/1406; G01N 2015/1481; G01N 21/27; G01N 15/01; G01N 2015/1493; G01N 15/1484; G01N 2015/1486; G01N 33/5008; G01N 33/5011; G01N 33/5026; G01N 33/6803; G01N 33/6842; G01N 1/4077; G01N 15/0618; G01N 2001/4088; G01N 2015/0053; G01N 2015/1411; G01N 1/34; G01N 1/4044; G01N 2015/1447; G01N 2800/12; G01N 2800/26; G01N 33/18; G01N 33/1873; G01N 33/54366; G01N 33/6848; G01N 33/6851; G01N 33/6893;

(Continued)

(56) References Cited

U.S. PATENT DOCUMENTS 11,619,579 B2 * 4/2023 Kawaguchi ........... B07C 5/3427
250/339.11
2020/0300704 A1 * 9/2020 Sekine .................. G01J 3/0208

FOREIGN PATENT DOCUMENTS

JP  58-96388 A  6/1983
JP  H0641876 U *  6/1994

(Continued)

*Primary Examiner* — Michael P Stafira (74) *Attorney, Agent, or Firm* — Canon U.S.A., Inc., IP Division (57) ABSTRACT

An identification apparatus that identifies properties of a specimen conveyed at a predetermined conveying velocity by a conveying unit includes an identification unit configured to identify a material included in the specimen and acquire a length in a conveying direction of the specimen, and a command unit configured to generate a control signal for controlling a screening device to perform a screening operation with predetermined intensity corresponding to the length, wherein the command unit changes the intensity of the screening operation per the length according to the length.

23 Claims, 8 Drawing Sheets

(58) Field of Classification Search
CPC .. G01N 15/042; G01N 15/05; G01N 15/1434; G01N 2015/047; G01N 2015/1415; G01N 21/41; G01N 33/4915; G01N 2021/845; G01N 21/65; G01N 21/84; G01N 2021/8455; G01N 21/3563; G01N 2021/8592; G01N 21/31; G01N 21/359; G01N 21/39; G01N 2201/104; G01N 2021/1765; G01N 21/718; G01N 2201/06113; G01N 2021/0389; G01N 21/03; G01N 21/17; G01N 15/0227; G01N 15/1429; G01N 15/147; G01N 2015/025; G01N 2015/0294; G01N 2015/1497; G01N 2201/1296; G01B 11/043; G01B 11/303
See application file for complete search history.

(56) References Cited

FOREIGN PATENT DOCUMENTS

| | | | |
|---|---|---|---|
| JP | 11-179293 A | | 7/1999 |
| JP | H11179293 A | * | 7/1999 |
| JP | 2004-219125 A | | 8/2004 |
| JP | 2011226821 A | * | 11/2011 |
| JP | 2017-176896 A | | 10/2017 |
| JP | 2019-105628 A | | 6/2019 |
| WO | WO-2021172274 A1 | * | 9/2021 ........... G01B 11/303 |

* cited by examiner

FIG.8A  CONTROL CONDITION 2A ACCORDING TO FIFTH EXEMPLARY EMBODIMENT

FIG.8B  CONTROL CONDITION 2B ACCORDING TO FIFTH EXEMPLARY EMBODIMENT

IDENTIFICATION APPARATUS

CROSS-REFERENCE TO RELATED APPLICATIONS

This application is a Continuation of International Patent Application No. PCT/JP2021/011567, filed Mar. 22, 2021, which claims the benefit of Japanese Patent Application No. 2020-057795, filed Mar. 27, 2020, both of which are hereby incorporated by reference herein in their entirety.

BACKGROUND OF THE INVENTION

Field of the Invention

The present invention relates to an identification apparatus that identifies the properties of a specimen.

Background Art

An identification apparatus is known that optically identifies the properties of a specimen using a spectroscopic analysis. Such an identification apparatus is placed in the middle of a conveying path on which a specimen is conveyed, and thereby is used to inspect a product or separate waste.

The spectroscopic analysis does not necessarily require a vacuum depressurization process that limits throughput, an atmosphere control process, a liquid immersion process, and an atmosphere management process related to a drying process, and can identify the properties of a specimen under the atmosphere. In this respect, in recent years, an attempt is made to apply the spectroscopic analysis to the separation of waste resin.

As the spectroscopic analysis, absorption spectroscopy that acquires the absorption spectrum of a specimen with respect to incident light and scattering spectroscopy that acquires the scattering spectrum of a specimen with respect to incident light are known. The scattering spectroscopy does not use transmitted light, and therefore is less likely to be influenced by light attenuation. Thus, the scattering spectroscopy is used to identify waste in which specimens vary in size and transmittance.

The properties of a specimen to be identified include characteristic information including the material and the physical property, and form information including the size, the shape, and the orientation. To identify the specimen with high throughput including screening, the properties included in both the characteristic information and the form information may be acquired in association with each other.

An identification apparatus is known that, to acquire the shape of a specimen, combines a camera that captures an image of the specimen and a spectral identification unit, thereby identifying the material and the size of the specimen. Patent literature 1 discusses a waste selection apparatus including a spectral unit that collects light in a predetermined region on a conveyor belt on which a plurality of specimens is placed, thereby acquiring spectral information, and a video camera that captures a predetermined region downstream of the light collection region of the spectral unit in a conveying direction.

A sorting apparatus is known that references a predetermined target condition and sorts an identified specimen based on whether the properties of the specimen satisfy the predetermined target condition. Patent literature 2 discusses a waste bottle sorting apparatus including a conveying unit that conveys waste bottles placed in a line in a conveying direction, a camera that captures an image of the conveyed waste bottles, an image processing device that estimates the barycentric positions of the waste bottles, and a valve driving device that blows compressed air to the waste bottles. The sorting apparatus discussed in patent literature 2 identifies the types and the centers of gravity of the waste bottles based on the colors and the sizes of the waste bottles acquired from the camera image, discharges compressed air toward the centers of gravity of the waste bottles, and sorts out the waste bottles.

CITATION LIST

Patent Literature

PTL 1: Japanese Unexamined Patent Application Publication No. 2002-540397
PTL 2: Japanese Patent Application Laid-Open No. H11-197609

In the sorting apparatus according to patent literature 2, depending on the size of an identified specimen, it is necessary to adjust the estimated values of the mass of the specimen and the time when the center of gravity of the specimen passes through a screening operation region. In the sorting apparatus according to patent literature 2, however, even if a specimen is strictly identified, and the mass and the time of passage of the specimen are estimated, and the specimen is sorted out based on the estimated mass and time of passage of the specimen, the specimen may not necessarily be able to be accurately sorted. It is confirmed that in such erroneous screening, in a case where a specimen is sorted out by discharging compressed air, and if the size or the specific gravity of the specimen is small, the accuracy of the screening may decrease.

SUMMARY OF THE INVENTION

The present invention is directed to providing an identification apparatus capable of generating a control signal that enables accurate selection based on the properties of a specimen including form information.

According to an aspect of the present invention, an identification apparatus that identifies properties of a specimen conveyed at a predetermined conveying velocity by a conveying unit includes an identification unit configured to identify a material included in the specimen and acquire a length in a conveying direction of the specimen, and a command unit configured to generate a control signal for controlling a screening device to perform a screening operation with predetermined intensity corresponding to the length, wherein the command unit changes the intensity of the screening operation per the length according to the length.

According to another aspect of the present invention, an identification apparatus that identifies properties of a specimen conveyed at a predetermined conveying velocity by a conveying unit includes an identification unit configured to identify a material contained in the specimen and acquire a size of the specimen, and a command unit configured to generate a control signal for controlling a screening device to perform a screening operation with predetermined intensity corresponding to the size, wherein the command unit changes the intensity of the screening operation per the size according to the size.

Further features of the present invention will become apparent from the following description of exemplary embodiments with reference to the attached drawings.

DESCRIPTION OF THE EMBODIMENTS

Exemplary embodiments of the present invention will be described below with reference to the drawings.

First Exemplary Embodiment

Figure 1:
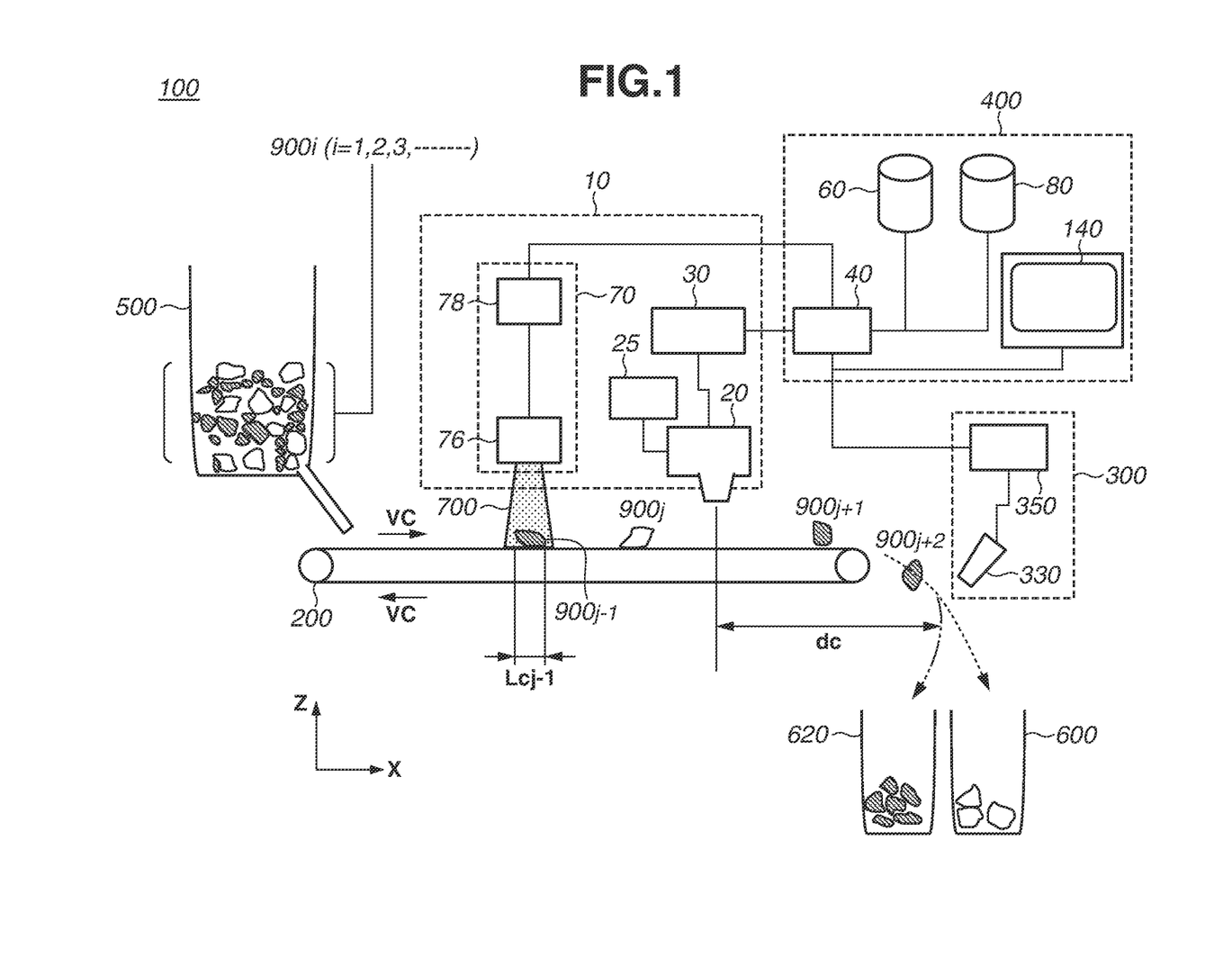
FIG. 1 is a diagram illustrating a general configuration of an identification apparatus according to a first exemplary embodiment.
Figure 2:
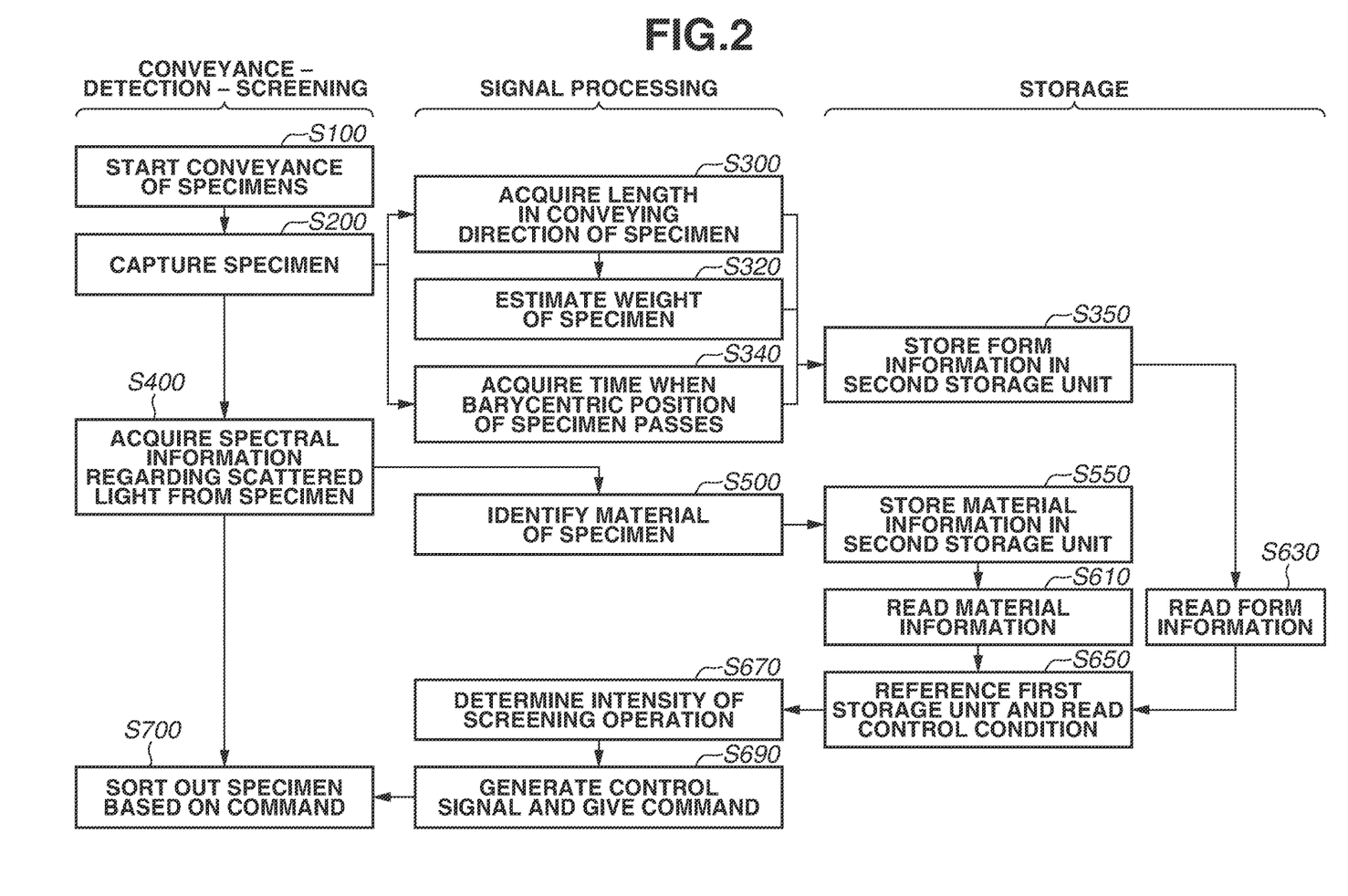
FIG. 2 is a flowchart illustrating an operation of the identification apparatus according to the first exemplary embodiment.
Figure 3:
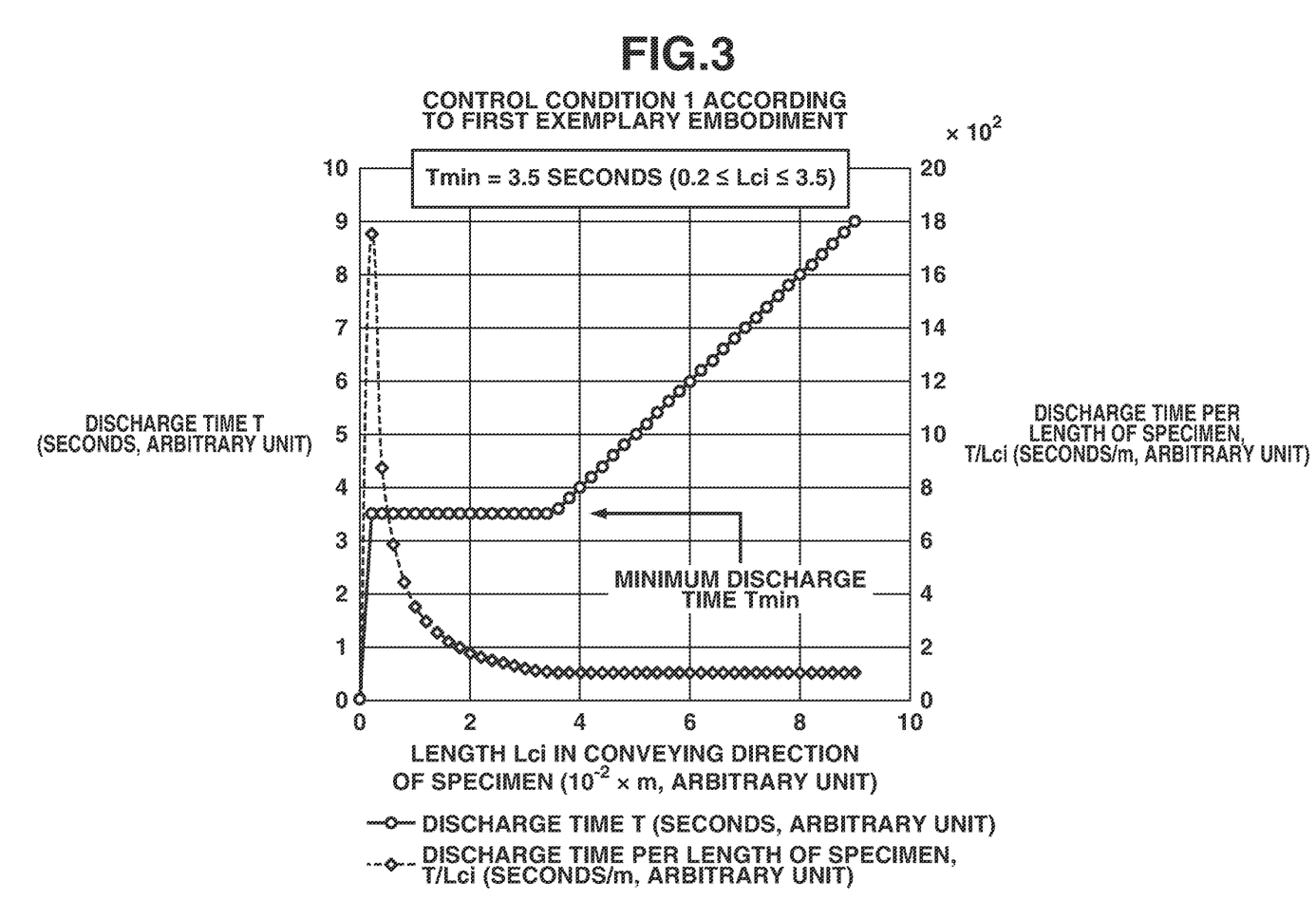
FIG. 3 is a graph illustrating a control condition according to the first exemplary embodiment.

With reference to FIGS. 1 to 3, the operations of an identification apparatus and an identification unit according to a first exemplary embodiment are described. FIG. 1 is a diagram schematically illustrating the configuration of an identification apparatus 100 according to the present exemplary embodiment.

The identification apparatus 100 includes an identification unit 10 that identifies the properties of a specimen 900$i$ conveyed at a predetermined conveying velocity vc by a conveying unit 200, and a command unit 40 that generates a control signal for controlling a screening operation of a screening device 300 based on the identified properties of the specimen 900$i$.

The conveying unit 200 is a unit that conveys a plurality of specimens 900$i$ (i=1, 2, . . . ) sequentially supplied from a sorter 500, at the predetermined conveying velocity vc in a conveying direction (an x-direction in FIG. 1). The conveying unit 200 moves each specimen 900$i$ to pass through an imaging field of view 700 of a camera 76 and a light collection region of a light collection unit 20 and therefore is occasionally also referred to as the "placement unit 200". The conveying unit 200 according to the present exemplary embodiment is a conveyor belt and linearly conveys the specimen 900$i$. As variations, the conveying unit 200 can be replaced by a turntable feeder that spirally conveys the specimen 900$i$ to outside, and a vibration feeder in which a vibrator moves the specimen 900$i$ in a predetermined direction.

The identification unit 10 includes the light collection unit 20 placed downstream of the sorter 500 of the conveying unit 200 to collect light from the conveying unit 200 or the specimen 900$i$, and an acquisition unit 30 that acquires spectral information regarding the light collected by the light collection unit 20. To receive Raman-scattered light, the identification unit 10 according to the present exemplary embodiment further includes a laser light source 25 optically connected to an irradiation optical system placed coaxially with a light collection optical system of the light collection unit 20.

The light collection unit 20 is optically linked to the acquisition unit 30 so that the acquisition unit 30 can acquire optical information reflecting a material contained in the specimen 900$i$. The acquisition unit 30 includes a spectral element and a two-dimensional imaging device (not illustrated) and acquires spectral information Si obtained by dispersing the collected light. Based on the spectral information Si regarding the specimen 900$i$, the identification unit 10 references a material database (not illustrated) in which reference data on Raman-scattered light is recorded. Then, based on the degree of similarity to the reference data, the identification unit 10 identifies a material included in the specimen 900$i$, thereby acquiring material information Mi.

To acquire a length Lci in the conveying direction (x) of the specimen 900$i$, the identification unit 10 includes a length measurement unit 70 including the camera 76 placed to overlap the imaging field of view 700 with the conveying unit 200, and an image processing unit 78 that performs image processing on an image captured by the camera 76. The image processing unit 78 performs image processing including contrast adjustment and contour extraction and acquires the length Lci in the conveying direction of each specimen 900$i$. The image processing unit 78 is occasionally also referred to as "a processing unit that acquires information regarding the size of each specimen 900$i$". The length measurement unit 70 can include a photointerrupter or a laser interferometer, instead of the camera 76.

The identification apparatus 100 includes a control unit 400 including the command unit 40 that controls the screening operation of the screening device 300 based on the properties of each specimen 900$i$, a first storage unit 60 that stores a control condition 1 for the screening operation, and a second storage unit 80 that stores the properties of each specimen 900$i$.

The first storage unit 60 is configured to store a control condition to control intensity Is of the screening operation of the screening device 300 corresponding to the length Lci in the conveying direction of each specimen 900$i$. The control condition is stored in the first storage unit 60 in a format such as a reference table, an algebraically expressed general formula, or statistical information. On the other hand, the second storage unit 80 is configured to store the length Lci in the conveying direction of each specimen 900$i$, the material information Mi, and a timing tp when the specimen 900$i$ passes through the light collection unit 20, which are information regarding the properties from the identification unit 10, in association with each other. The control unit 400 includes a display unit 140 that provides a graphical user interface (GUI) through which a user can specify a control condition. The display unit 140 may display information acquired by the identification unit 10.

The command unit 40 references the first storage unit 60 and the second storage unit 80, thereby generating a command to control the screening operation of the screening device 300 according to the material and the size of each specimen 900$i$, i.e., the material information Mi regarding and the length Lci in the conveying direction of each specimen 900$i$.

The screening device 300 includes an air nozzle 330 that discharges compressed air for a predetermined discharge time, at a predetermined discharge velocity, and at a predetermined discharge flow rate, and a screening control unit 350 that controls a solenoid valve (not illustrated) included in the air nozzle 330. The screening control unit 350 receives a control signal from the command unit 40 of the identification apparatus 100. The screening operation of the screening device 300 according to the present exemplary embodiment includes the operation of discharging a fluid. Examples of the fluid subjected to the discharge operation include air, dry nitrogen, an inert gas such as a rare gas, a liquid, and a gas-liquid mixture fluid (aerosol). Based on a control signal with which a command is given by the command unit 40, the screening device 300 collects the specimen 900$i$ in a target collection basket 620 or a non-target collection basket 600 according to the properties of the specimen 900$i$ including the material information Mi and form information Fi.

In the screening device 300, a discharge device that discharges a fluid can be replaced by a flap gate that opens and closes at a predetermined angular velocity, or a shutter that opens and closes at a predetermined velocity. The identification unit 10, the control unit 400, and the screening device 300 included in the identification apparatus 100, and the components of the identification unit 10, the control unit 400, and the screening device 300 can be placed in parallel at different positions in the width direction of the conveyance of the conveying unit 200, thereby achieving the intensification of the system and high-speed processing. Such parallel placement is occasionally also referred to as "multi-row placement" or "multiple-row placement". The screening device 300 is a unit that biases the conveyed specimen 900$i$ with an external force to change the moving direction or the moving velocity of the conveyed specimen 900$i$ at the exit of the conveying unit 200, and therefore is occasionally also referred to as an "biasing unit".

Next, with reference to FIGS. 2 and 3, control of the screening device 300 by the identification apparatus 100 according to the present exemplary embodiment is described. FIG. 2 is a flowchart illustrating operations regarding identification of the identification unit 10 and a command from the command unit 40 in the identification apparatus 100. FIG. 3 is a diagram illustrating the control condition 1 for the identification apparatus 100. The control condition 1 according to the present exemplary embodiment is a control condition that changes a discharge time T of the compressed air of the screening device 300 according to the size of the specimen 900$i$. That is, the control condition 1 according to the present exemplary embodiment is a control condition that sets the discharge time T of the compressed air of the screening device 300 as the intensity Is of the screening operation and changes the intensity Is of the screening operation according to the length Lci in the conveying direction of the specimen 900$i$.

(Step S100)

In this step, the conveyance of the plurality of specimens 900$i$ (i=1, 2, ..., j−1, j, j+1, ...) is started. In the present exemplary embodiment, the sorter 500 placed upstream of the conveying unit 200 including the conveyor belt that is rotationally driven sequentially supplies the plurality of specimens 900$i$ to the conveying unit 200. In other words, this step is the step of placing the specimens 900$i$ on the conveying unit 200. From this point onward, in the specification of the present application and FIGS. 1 and 6, the conveying unit 200 sequentially conveys the plurality of specimens 900$i$ (i=1, 2, ..., j−1, j, j+1, ...) in descending order i with the lapse of time.

(Step S200)

In this step, the camera 76 captures an image of each specimen 900$i$ conveyed on the conveying unit 200.

(Step S300)

In this step, the image processing unit 78 performs image processing on the camera image and acquires the length Lci in the conveying direction of the specimen 900$i$. The camera image may be acquired by capturing the specimen 900$i$ through a predetermined optical filter in view of the light reflection characteristics of a group of specimens and the conveyer belt as the background, or the contour of the specimen 900$i$ in the camera image may be enhanced by applying an appropriate image processing filter.

(Step S320)

In this step, the projected area and the mass of the specimen 900$i$ are estimated from the contour of the extracted specimen 900$i$. This step is selectively performed, and the obtained estimated mass can be used as learning data for machine learning in association with the setting of the intensity Is of the screening operation and the projected shape and the projected area of the extracted specimen 900$i$.

(Step S340)

In this step, a barycentric position P of the specimen 900$i$ is acquired from the contour of the extracted specimen 900$i$. Together with the conveying velocity vc and a screening distance dc corresponding to a screening time, the barycentric position P is used to calculate the time when the barycentric position P of the specimen 900$i$ passes through a screening operation region of the screening device 300. The order of steps S300, S320, and S340 can be switched, or steps S300, S320, and S340 may be simultaneously performed.

(Step S350)

In this step, the form information Fi regarding the specimen 900$i$ acquired in steps S300, S320, and S340 is stored in the second storage unit 80 so that the form information Fi can be used to generate a control signal. That is, in step S350, the form information Fi is stored in association with the image capturing time in the second storage unit 80.

In the second storage unit 80, the captured data acquired in step S200 may be stored in association with the image capturing time and the form information Fi. A form in which the captured data acquired in step S200 is stored in association with the image capturing time in the second storage unit 80, and the form information Fi such as the length Lci and the barycentric position P is read from the second storage unit 80 and then is acquired by calculation is a variation form of the present exemplary embodiment.

(Step S400)

In this step, the acquisition unit 30 acquires a spectral image of light obtained by the light collection unit 20 collecting scattered light from the specimen 900$i$, thereby acquiring the spectral information Si regarding the specimen 900$i$.

(Step S500)

In this step, the material of the specimen 900$i$ is identified, thereby acquiring the material information Mi. Based on the spectral information Si regarding the specimen 900$i$, the identification unit 10 references a material database (not illustrated) in which reference data on Raman-scattered light is recorded. Then, based on the degree of similarity to the reference data, the identification unit 10 identifies the material of the specimen 900$i$, thereby acquiring the material information Mi.

(Step S550)

In this step, the material information Mi regarding the specimen 900$i$ acquired in step S500 is stored in the second storage unit 80 so that the material information Mi can be used to generate a control signal. That is, in step S550, the material information Mi is stored in association with the light collection time or the form information Fi in the second storage unit 80.

In step S550 according to the present exemplary embodiment, the spectral image or the spectrum acquired in step S400 may be stored in association with the light collection time or the form information Fi in the second storage unit 80.
(Step S610)

In this step, the material information Mi corresponding to the specimen 900i is read from the second storage unit 80.
(Step S630)

In this step, the form information Fi corresponding to the specimen 900i is read from the second storage unit 80.
(Step S650)

In this step, the control condition 1 illustrated in FIG. 3 is read from the first storage unit 60.
(Step S670)

In this step, the discharge time T corresponding to the length Lci in the conveying direction of the specimen 900i is determined. The determined discharge time T is included in the intensity Is of the screening operation of the screening device 300. The discharge time T determined in this step corresponds to the period of operation time of the screening operation of the screening device 300.
(Step S690)

In this step, a control signal including the discharge time T determined in step S670 is generated, and a command is given to the screening control unit 350 using the control signal.
(Step S700)

In this step, based on the control signal, the screening device 300 sorts the specimen 900i.

In the present exemplary embodiment, the discharge time T determined in step S670, which is the intensity Is of the screening operation, is determined based on the control condition 1 stored in the first storage unit 60. The control condition 1 is a control condition that sets the discharge time T of the compressed air from the air nozzle 330 as the intensity Is of the screening operation and changes the intensity Is of the screening operation according to the length Lci in the conveying direction of the specimen 900i. In other words, the control condition 1 according to the present exemplary embodiment has a control pattern for increasing the intensity Is of the screening operation per the length Lci in the conveying direction of the specimen 900i according to a decrease in the length Lci, on the side where the length Lci is small. In other words, the control condition 1 according to the present exemplary embodiment has a control pattern for changing the intensity Is of the screening operation per the length Lci in the conveying direction of the specimen 900i according to a decrease in the length Lci.

As indicated by a solid profile in FIG. 3, the control condition 1 according to the present exemplary embodiment indicates a non-linear profile with respect to the length Lci of the specimen 900i where the discharge time T does not asymptotically approach 0 on the side where the length Lci of the specimen 900i decreases, and the lower limit of the discharge time T is a minimum discharge time Tmin.

In the graph in FIG. 3, T/Lci corresponding to the discharge time T per the length Lci of the specimen 900i is indicated by dashed plots. The numerical value of T/Lci can be read from the vertical axis on the right side. From this graph, it is indicated that T/Lci corresponding to the discharge time per the length Lci in the conveying direction of the specimen 900i is great on the side where the length Lci is small, and that the smaller the detected size of the specimen 900i is, the greater the intensity Is of the screening operation per the length Lci of the specimen 900i is set by the command in step S690. The control condition 1 according to the present exemplary embodiment improves the recycling collection rate of an identification apparatus that identifies waste in which a group of specimens vary in size, as specimens.

Second Exemplary Embodiment

Figure 4:
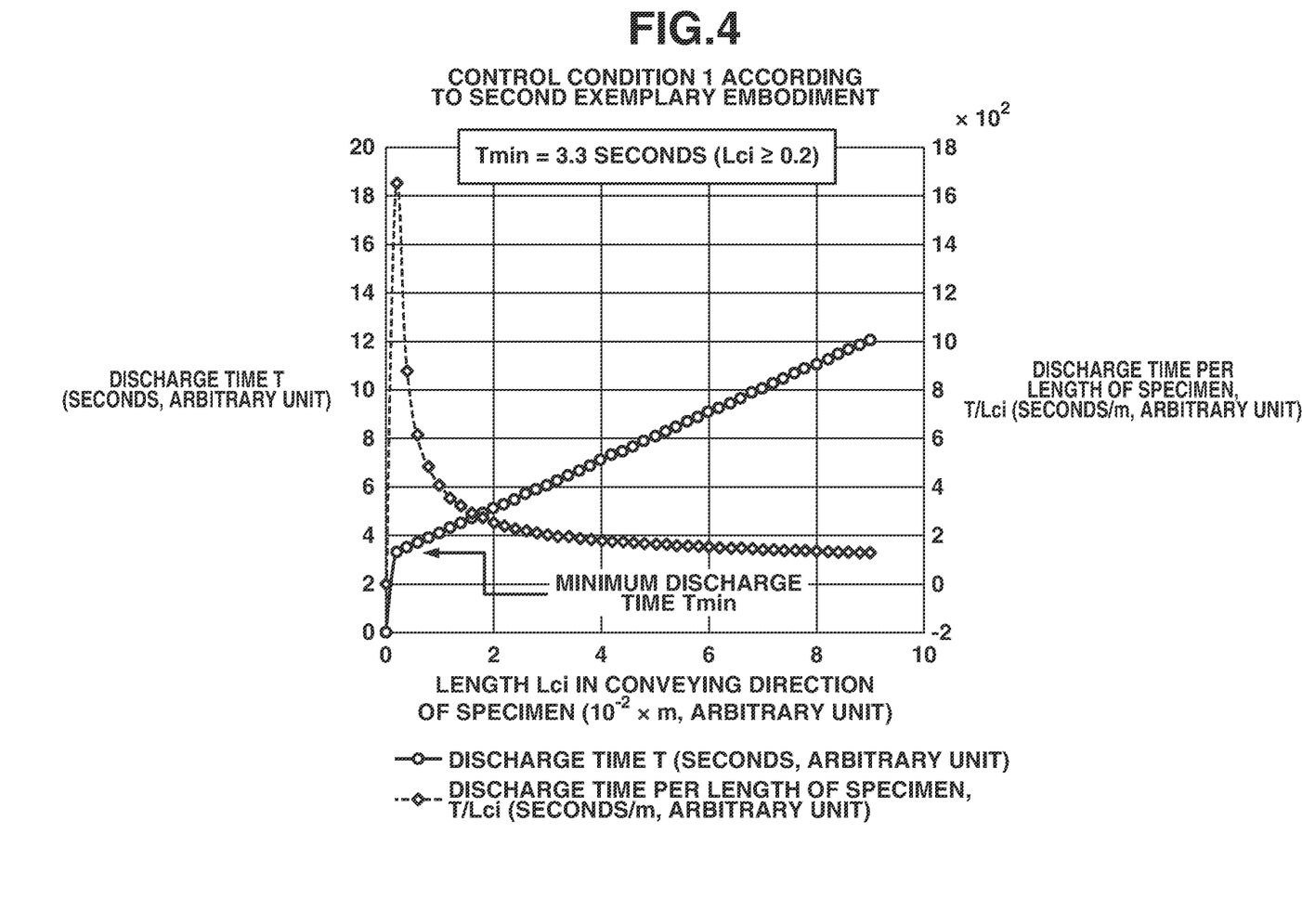
FIG. 4 is a graph illustrating a control condition according to a second exemplary embodiment.

With reference to FIG. 4, the operation of an identification unit of an identification apparatus according to a second exemplary embodiment is described. The control condition 1 according to the present exemplary embodiment is a control condition that sets the discharge time T of the compressed air of the screening device 300 as the intensity Is of the screening operation and changes the intensity Is of the screening operation according to the length Lci in the conveying direction of the specimen 900i.

As indicated by a solid profile in FIG. 4, the control condition 1 according to the present exemplary embodiment indicates a non-linear profile with respect to the length Lci of the specimen 900i where the discharge time T does not asymptotically approach 0 on the side where the length Lci of the specimen 900i decreases, and the lower limit of the discharge time T is the minimum discharge time Tmin.

The control condition 1 according to the present exemplary embodiment is different from the control condition 1 according to the first exemplary embodiment in that the non-linear profile of the discharge time T of the compressed air with respect to the length Lci of the specimen 900i does not include a section where a constant value is taken on the side where the length Lci of the specimen 900i is small. Also in the present exemplary embodiment, however, it is indicated that the discharge time per the length Lci of the specimen 900i, T/Lci is great on the side where the length Lci is small, and that the smaller the detected size of the specimen 900i is, the greater the intensity Is of the screening operation per the length Lci of the specimen 900i is set by the control.

Third Exemplary Embodiment

Figure 5:
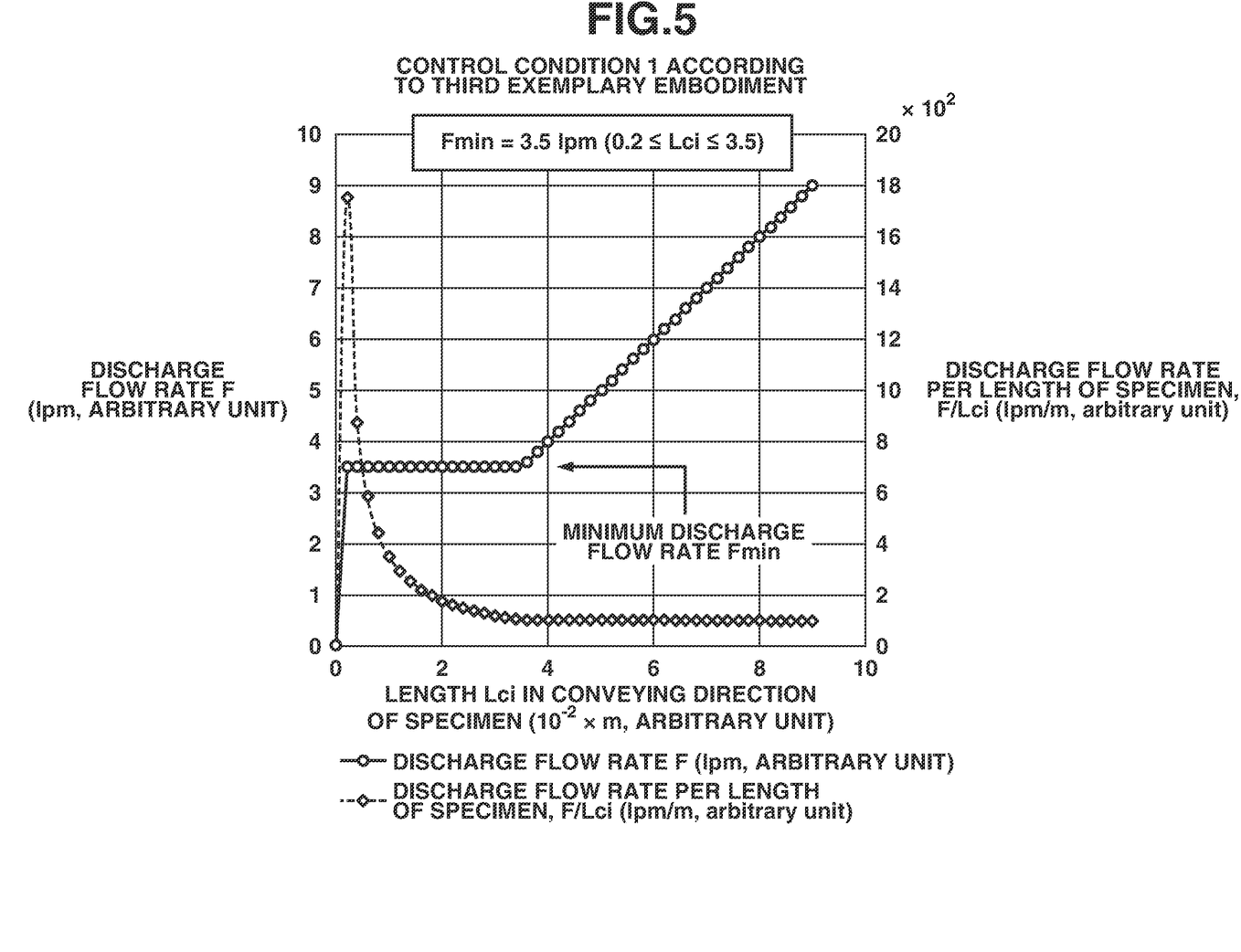
FIG. 5 is a graph illustrating a control condition according to a third exemplary embodiment.

With reference to FIG. 5, the operation of an identification unit of an identification apparatus according to a third exemplary embodiment is described. The control condition 1 according to the present exemplary embodiment is a control condition that sets a discharge flow rate F of the compressed air of the screening device 300 as the intensity Is of the screening operation and changes the intensity Is of the screening operation according to the length Lci in the conveying direction of the specimen 900i. The control condition 1 according to the present exemplary embodiment is different from the control condition 1 according to the first exemplary embodiment in that the type of the intensity Is of the screening operation is the flow rate F (lpm) of the compressed air. Also in the present exemplary embodiment, it is indicated that a discharge flow rate per the length Lci of the specimen 900i, F/Lci is great on the side where the length Lci is small, and that the smaller the detected size of the specimen 900i is, the greater the intensity Is of the screening operation per the length Lci of the specimen 900i is set by the control.

Fourth Exemplary Embodiment

Figure 6:
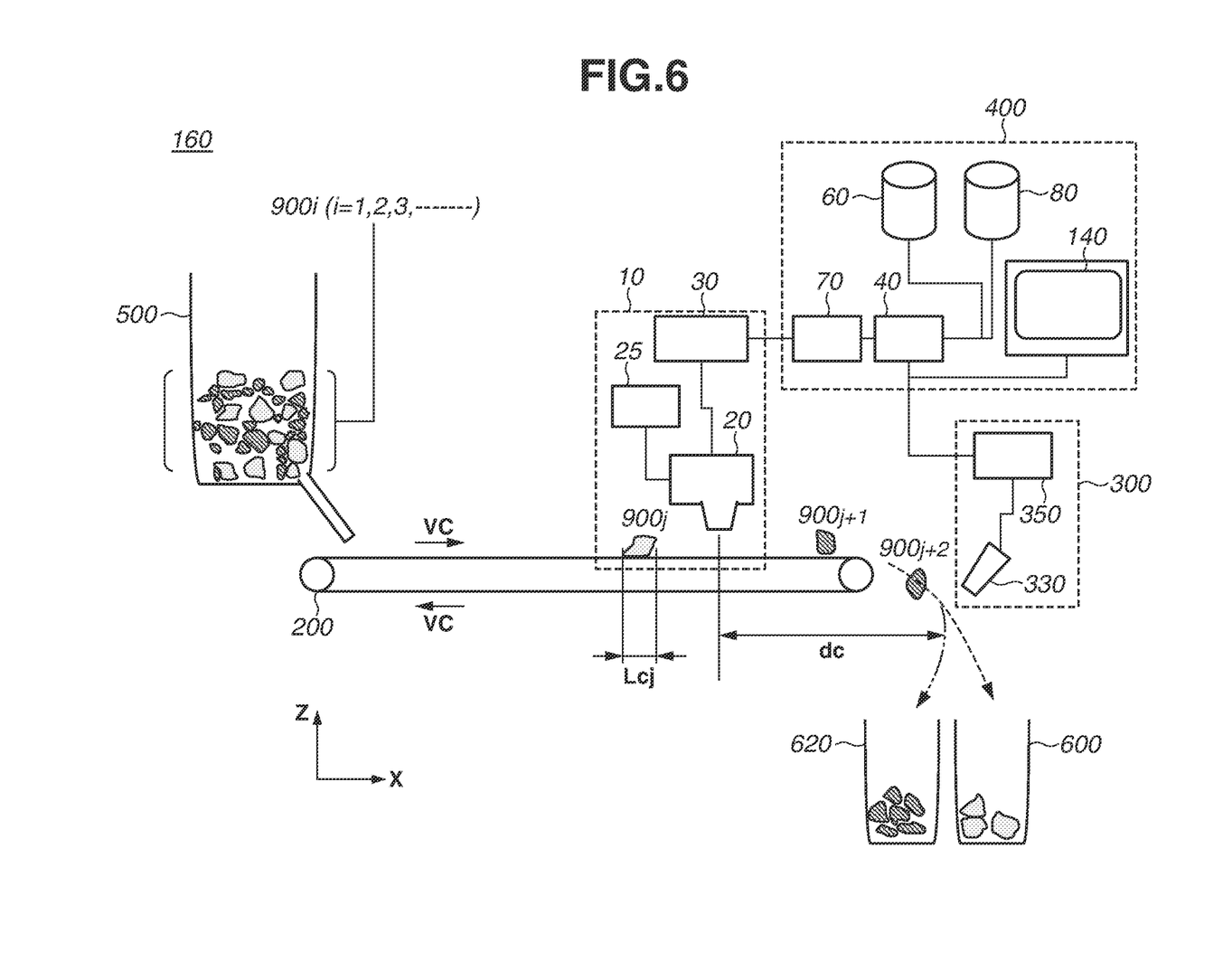
FIG. 6 is a diagram illustrating a general configuration of an identification apparatus according to a fourth exemplary embodiment.
Figure 7:
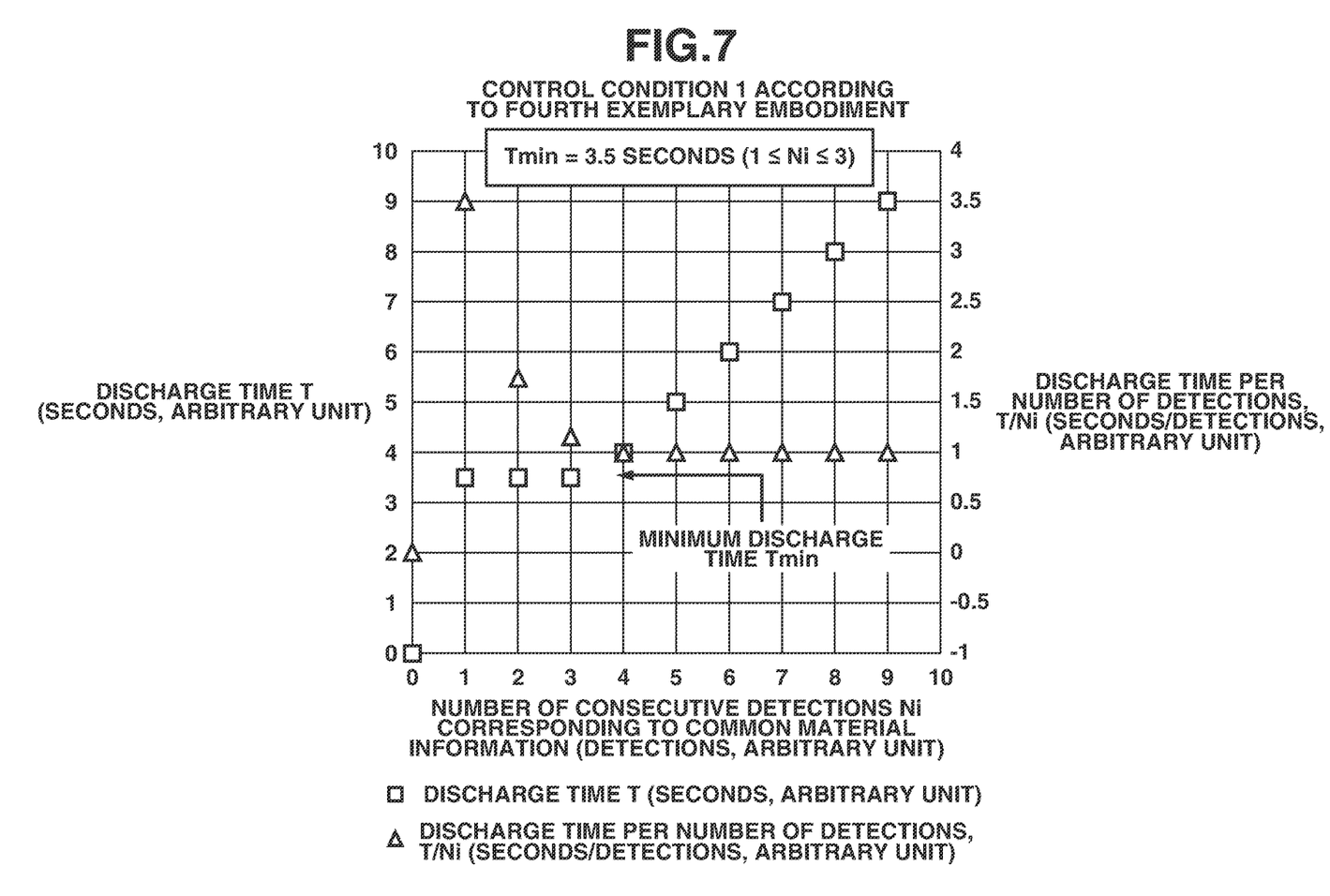
FIG. 7 is a graph illustrating a control condition according to the fourth exemplary embodiment.

With reference to FIGS. 6 and 7, the operation of an identification unit of an identification apparatus according to a fourth exemplary embodiment is described.

An identification apparatus 160 according to the present exemplary embodiment identifies the length Lci based on the sampling period (seconds) in which the spectral information Si acquired by the identification unit 10 is acquired, the number of times of sampling N, and the conveying velocity vc (m/seconds). The identification apparatus 160 is different from the identification apparatus 100 in that the identification apparatus 160 does not include a camera and an image processing unit for detecting the length Lci in the conveying direction of the specimen 900i. In other words, the identification apparatus 160 according to the present exemplary embodiment estimates the size of the specimen 900i based on the number of consecutive detections Ni that the spectral information Si acquired by the identification unit 10 is acquired. The number of times of sampling N is occasionally also referred to as "the number of consecutive detections".

As illustrated in FIG. 7, the control condition 1 according to the present exemplary embodiment is a control condition discretely set by the horizontal axis representing the number of consecutive detections Ni that the specimen 900i corresponding to common material information Mi is consecutively detected, instead of the length Lci of the specimen 900i in the control condition 1 according to each of the first to third exemplary embodiments. The number of consecutive detections Ni of the specimen 900i is equivalent to the number of times the spectral information Si corresponding to the common material information Mi is consecutively acquired.

As indicated by square plots in FIG. 7, the control condition 1 according to the present exemplary embodiment indicates a non-linear profile where the discharge time T does not asymptotically approach 0 on the side where the number of consecutive detections Ni is small and which corresponds to a decrease in the length Lci of the specimen 900i, and takes the minimum discharge time Tmin.

In the graph in FIG. 7, T/Ni corresponding to the discharge time T per the number of consecutive detections Ni is indicated by triangular plots. The numerical value of T/Ni can be read from the vertical axis on the right side. From this graph, it is indicated that the discharge time per the number of consecutive detections Ni correlated to the length Lci in the conveying direction of the specimen 900i, T/Ni is great on the side where the number of consecutive detections Ni is small, and that the smaller the detected size of the specimen 900i is, the greater the intensity Is of the screening operation per the size of the specimen 900i is set by the command. Similarly to the other exemplary embodiments, the control condition 1 according to the present exemplary embodiment improves the recycling collection rate of an identification apparatus that identifies waste in which a group of specimens vary in size, as specimens.

The identification unit 10 and the length measurement unit 70 according to the fourth exemplary embodiment can be replaced by a hyperspectral camera or a multiband camera capable of acquiring the length of and spectral information regarding a specimen from a captured image. That is, the identification apparatus 160 according to the fourth exemplary embodiment uses the history of the spectrum, thereby compensating for the absence of distribution information regarding the spectrum and acquiring the material information Mi and the form information Fi regarding the specimen 900i. In contrast, it can be said that an identification apparatus according to a variation (not illustrated) includes a detection system that acquires multi-dimensional data from which material information and form information can be read.

Fifth Exemplary Embodiment

Figure 8A:
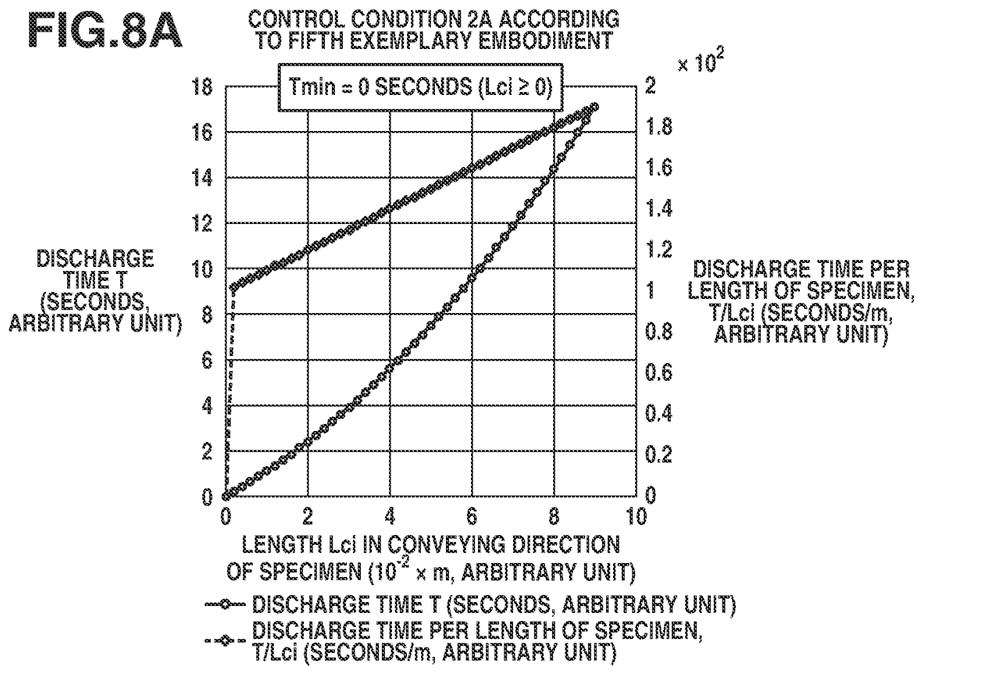
FIG. 8A is a graph illustrating a control condition 2A according to a fifth exemplary embodiment.
Figure 8B:
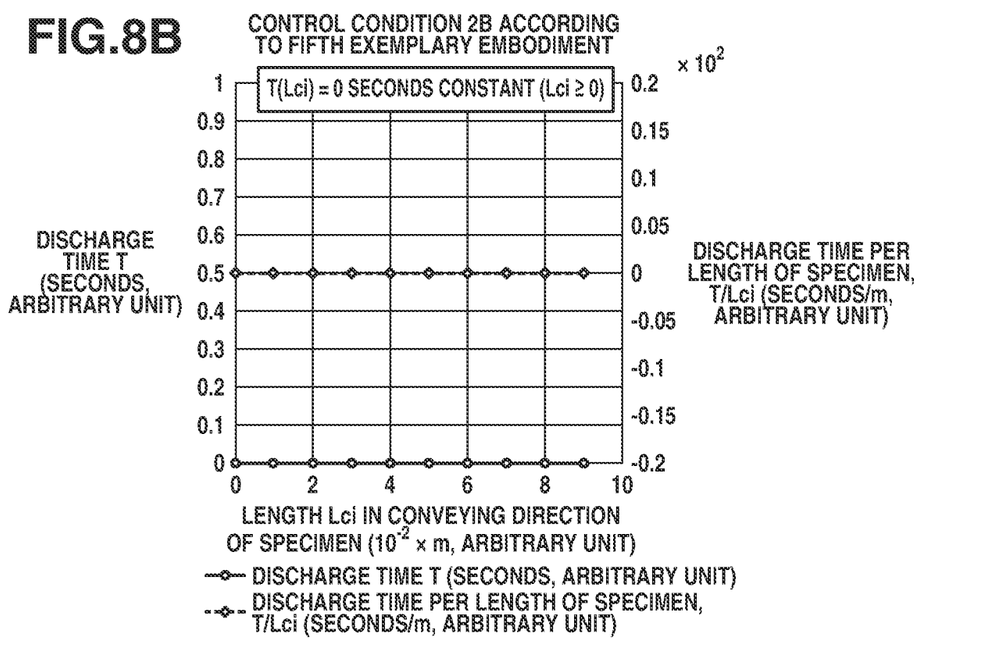
FIG. 8B is a graph illustrating a control condition 2B according to the fifth exemplary embodiment.

With reference to FIGS. 8A and 8B, the operation of an identification unit of an identification apparatus according to a fifth exemplary embodiment is described. The configuration of the identification apparatus according to the present exemplary embodiment is similar to that according to the first exemplary embodiment. The present exemplary embodiment is different from the first exemplary embodiment in that in a case where it is detected from an image captured by the camera 76 that a plurality of specimens 900i is in proximity in the conveying direction, the control condition 1 is changed to another control condition.

A control condition 2A illustrated in FIG. 8A has a control pattern in which the minimum intensity of the intensity Is of the screening operation asymptotically approaches 0 in the direction in which the length Lci of the specimen 900i decreases.

The control condition 2A includes a control pattern in which the intensity Is of the screening operation per the length Lci of the specimen 900i decreases according to a decrease in the length Lci. That is, the control condition 2A includes a control pattern in which the discharge time of the compressed air per the length Lci of the specimen 900i, T/Lci decreases according to a decrease in the length Lci.

On the other hand, a control condition 2B illustrated in FIG. 8B has a control pattern in which the intensity Is of the screening operation indicates a constant value of 0, regardless of the length Lci of the specimen 900i, and which corresponds to a command to stop the discharge of the compressed air.

In the control condition 2A according to the present exemplary embodiment, the discharge accuracy for a small-sized specimen is lower than that in the control condition 1. However, in a case where a plurality of specimens is in proximity in the conveying direction, the control condition 2A prevents the plurality of specimens from being sorted out together by airflow provided at a time. The control condition 2B according to the present exemplary embodiment can reduce the possibility that a plurality of specimens is all erroneously collected due to proximity.

The control condition 2A or 2B according to the present exemplary embodiment is used to reduce the risk of erroneous screening in a case where the command unit 40 detects that a plurality of specimens passes through the screening operation region of the screening device 300 at time intervals shorter than the discharge time T of the compressed air based on the control condition 1.

The present invention is not limited to the above embodiments and various changes and modifications can be made within the spirit and scope of the present invention. Therefore, to apprise the public of the scope of the present invention, the following claims are made.

According to the present invention, it is possible to provide an identification apparatus capable of generating a control signal that enables accurate selection based on the properties of a specimen including form information.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

The invention claimed is:
1. An identification apparatus that identifies properties of a specimen conveyed at a predetermined conveying velocity by a conveying unit, the identification apparatus comprising:
    an identification unit configured to identify a material included in the specimen and acquire a length in a conveying direction of the specimen; and a command unit configured to generate a control signal for controlling a screening device to perform a screening operation including discharge of a fluid with predetermined intensity corresponding to the length, wherein the command unit is configured to increase the intensity of the screening operation per the length according to a decrease of the length under the condition that the length is equal to or less than a predetermined reference length.

2. The identification apparatus according to claim 1, wherein the intensity of the screening operation includes a period of operation time in which the screening device sorts out the specimen.

3. The identification apparatus according to claim 1, wherein the intensity of the screening operation includes at least any of a discharge time of the fluid, a discharge velocity of the fluid, or a discharge flow rate of the fluid.

4. The identification apparatus according to claim 1, wherein the fluid includes at least any of air, nitrogen, an inert gas, or water.

5. The identification apparatus according to claim 1, wherein the identification unit includes a light collection unit configured to collect light from the conveying unit or the specimen.

6. The identification apparatus according to claim 5, wherein the identification unit includes an acquisition unit configured to acquire spectral information regarding the light collected by the light collection unit.

7. The identification apparatus according to claim 6, wherein the light collection unit collects light at a predetermined sampling period.

8. The identification apparatus according to claim 7, further comprising a length measurement unit configured to acquire the length.

9. The identification apparatus according to claim 8, wherein the length measurement unit acquires the length based on the material and the number of times of sampling by the light collection unit corresponding to the material.

10. The identification apparatus according to claim 1, further comprising a length measurement unit configured to acquire the length.

11. The identification apparatus according to claim 10, wherein the length measurement unit includes at least any of a camera, a photointerrupter, or a laser interferometer.

12. The identification apparatus according to claim 1, further comprising a first storage unit configured to store a control condition for the intensity of the screening operation corresponding to the length.

13. The identification apparatus according to claim 12, wherein the command unit references the first storage unit, thereby generating the control signal for changing the intensity of the screening operation per the length according to the length.

14. The identification apparatus according to claim 12, further comprising a second storage unit configured to store information regarding the length.

15. The identification apparatus according to claim 12, wherein the control condition includes a first control condition that increases the intensity of the screening operation per the length according to a decrease in the length.

16. The identification apparatus according to claim 15, wherein the control condition includes a second control condition that decreases the intensity of the screening operation per the length according to a decrease in the length or makes the intensity of the screening operation per the length constant relative to a decrease in the length.

17. The identification apparatus according to claim 16, wherein in a case where the intensity of the screening operation is a period of operation time in which the screening device sorts out the specimen, and in a case where it is detected that a plurality of the specimens passes through a screening operation region of the screening device at time intervals shorter than the period of operation time determined based on the first control condition, the command unit generates the control signal based on the second control condition.

18. The identification apparatus according to claim 5, wherein the light collection unit collects Raman-scattered light from the specimen or the conveying unit.

19. The identification apparatus according to claim 1, further comprising the screening device.

20. The identification apparatus according to claim 1, wherein the screening device changes a moving direction or a moving velocity of the conveyed specimen.

21. The identification apparatus according to claim 1, further comprising the conveying unit.

22. The identification apparatus according to claim 1, wherein the command unit is configured to decrease the intensity of the screening operation according to a decrease of the length under the condition that the length exceeds the predetermined reference length.

23. The identification apparatus according to claim 1, wherein the command unit is configured to generate the control signal for controlling the screening device to perform the screening operation which has a control pattern including a minimum intensity of the intensity of the screening operation in association with the predetermined reference length.

* * * * *